March 15, 1960    E. B. LANCASTER ET AL    2,929,010
DIFFERENTIAL AMMETER FOR ALTERNATING CURRENT MOTORS
Filed Oct. 18, 1957      2 Sheets-Sheet 1
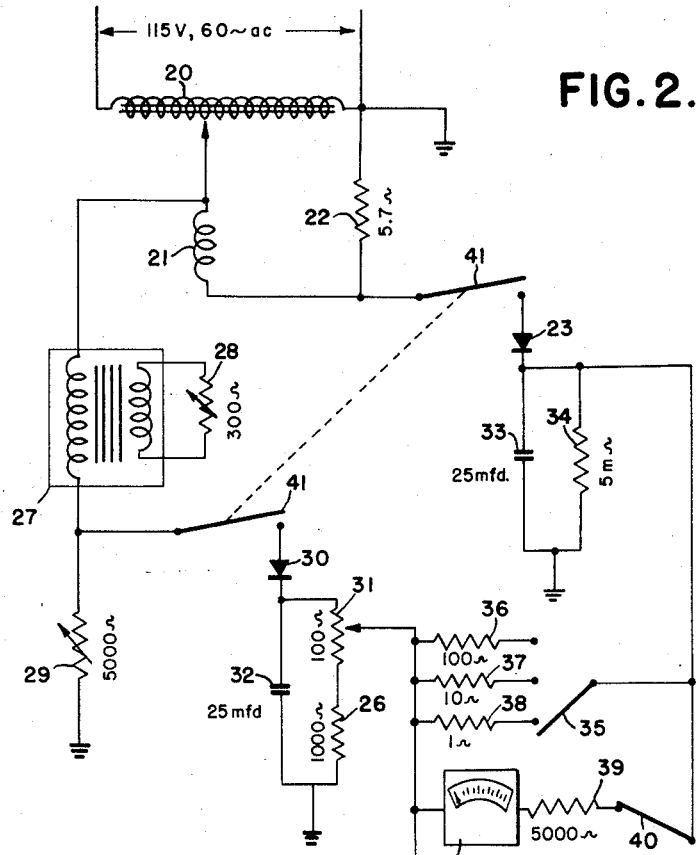
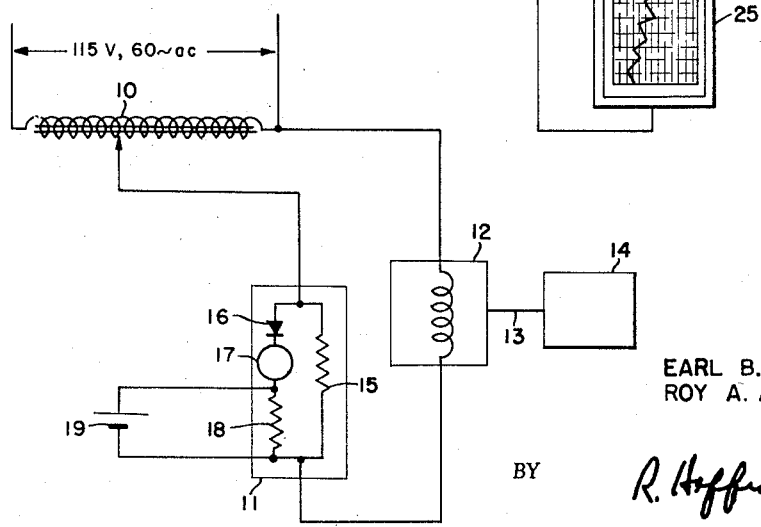
INVENTORS
EARL B. LANCASTER
ROY A. ANDERSON
BY *R. Hoffman*
ATTORNEY

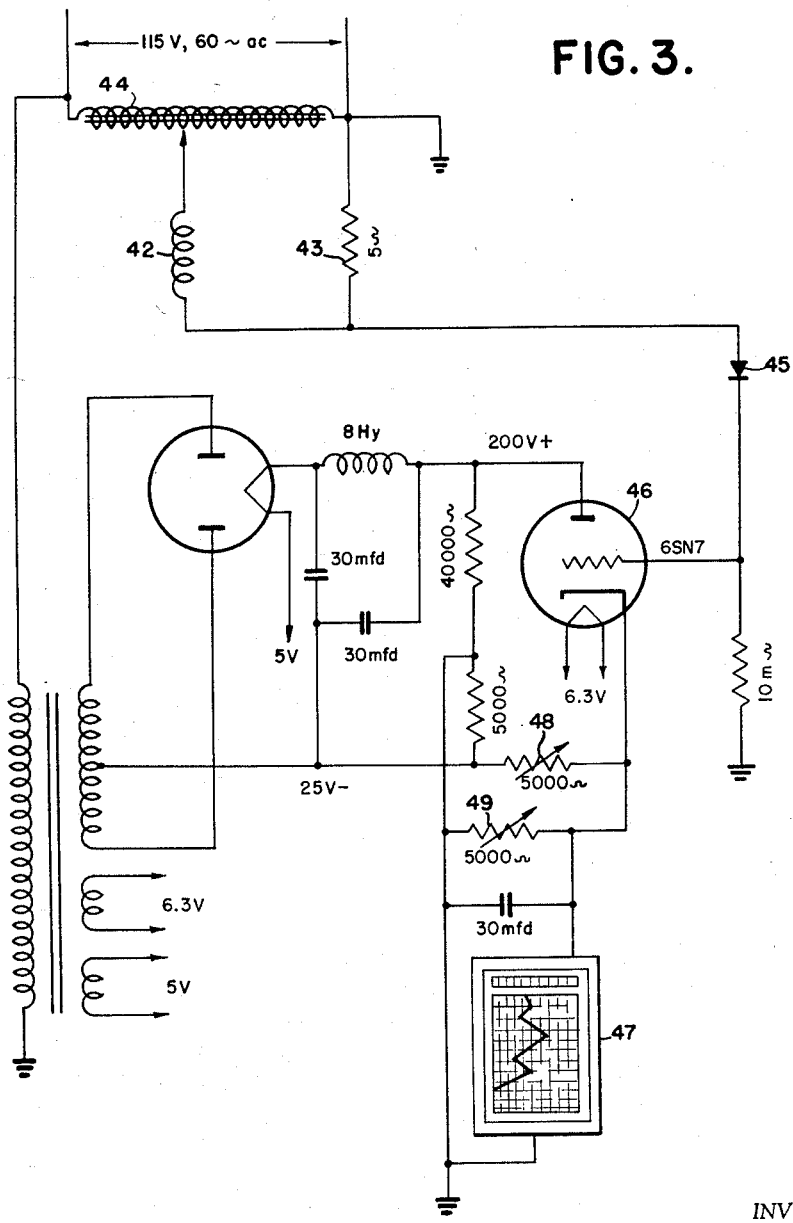

United States Patent Office 2,929,010
Patented Mar. 15, 1960

2,929,010

DIFFERENTIAL AMMETER FOR ALTERNATING CURRENT MOTORS

Earl B. Lancaster, Peoria, and Roy A. Anderson, Peoria Heights, Ill., assignors to the United States of America as represented by the Secretary of Agriculture Application October 18, 1957, Serial No. 691,113

3 Claims. (Cl. 318—490)

(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to a device useful in measuring small increments of load applied to alternating current motors and particularly useful where such applied load is a very small fraction of the full load capacity of the motor. More particularly, the invention relates to an apparatus containing the device for continuously recording a function of load increase when mixtures of water and finely divided starchy or glutenous products such as wheat starch, wheat flour, wheat gluten, cake mixes, and the like, are mixed together for an extended time. This is known to those skilled in the art as measurement of the rheological properties of pastes, batters, and doughs. The device and combinations of it and accessory equipment to form a multi-range recording apparatus has wide applications in the field of laboratory experimentation where it is not unusual to find mixers and/or motors which are operating at much below their design capacity, and the experiments and results hereinafter described are not intended to restrict the invention to any one combination of meters, motors, or mixers, but are merely to illustrate the principles of the invention.

Two preferred embodiments of the invention have been chosen to illustrate and describe it.

Figure 1 is a schematic representation of the general principle of the invention.

Figure 2 is a schematic diagram of one species of the invention which incorporates a bridge circuit for sensing changes in motor current.

Figure 3 is a schematic diagram of another species of the invention which incorporates an electronic voltmeter for sensing changes in motor current.

The invention is schematically described in Figure 1, where the motor is preferably of the brushless induction type operating normally from a single phase, 115–120 volt, 60 cycle A.C. power source, with any speed reduction accomplished mechanically. In the conventional method of measurement, the power source is connected to the motor 12 through an A.C. ammeter which may be similar to the differential ammeter 11 shown in Figure 1 except that the value of the resistor 18 is zero, and no external D.C. power source 19 is necessary. In such a case, the meter 17 will show that an appropriate current is flowing through the motor even when no load is being applied thereto, and furthermore, that small increments in load produce very little change in said current. This phenomenon is a well-known characteristic of many alternating current motors. For example, the motor of a mixer used for preparing a flour-water batter was found to use 2.5 amperes with no material in the mixing bowl, but when the bowl was full of material, the maximum current drawn by the motor was only 2.55 amperes. Increments of rise in motor load were thus obscured by the necessity of using a high meter range (i.e., low sensitivity) to express the current at no load.

The invention, as described in Figure 1 overcomes this difficulty in two ways. First, the motor is operated at reduced voltage supplied by a variable voltage source, such as variable transformer 10. This reduces the no-load current to the motor 12, but more important to the device, increases the proportionate effect of increases in load over no load current. The voltage under which the motor is operated should be high enough so that the motor does not stall at the maximum imposed load 14, acting on the motor 12 and through shaft 13, preferably such that the stall point is at least double the maximum expected load. It should be low enough so that appreciable gain in load sensitivity is obtained without appreciable reduction in motor speed. The second way of improving the sensitivity of the device is by introducing the resistor 18 and a D.C. power source 19 into the conventional precision shunt ammeter consisting of a sensitive D.C. meter 17, a rectifying device 16 which may be a small semiconductor such as copper oxide, selenium, or germanium rectifiers, and a precision shunt resistor 15, which should be constructed of material having a low coefficient of thermal resistance change such as Advance and the like, the whole forming the differential ammeter 11. The polarity and magnitude of the D.C. source, the resistors 15 and 18, and/or circuits accompanying them must be selected so that the D.C. voltages on the two sides of meter 17 may be made equal even when appreciable A.C. current is flowing through the motor, but permits a difference in D.C. voltage to arise when the aforesaid A.C. current increases. By this means, the meter 17 may be made to have a zero reading when the motor 12 is operating on load 14 but as yet is doing no useful work. The advantage of such operation of the meter is that by proper choice of meter sensitivity by well-known means employing series and/or parallel resistors, small increments of load thereafter applied to the motor may be made to cause relatively large deflections in the meter indication, thereby making it possible to minutely examine the changes in useful work done by the motor on the material being investigated.

It is to be understood that the combinations of elements may be manifold, especially in the way in which the D.C. power source 19 may be derived, and appropriate resistance combined with it. It is also to be understood that the meter 17 and resistance 18 and their accompanying elements may be transposed in position if advantageous.

The invention may also be applied to polyphase as well as to single phase systems by inserting a small precision resistor or a small transformer into one leg of the polyphase system.

Two species of the invention are given in Figures 2 and 3, which are circuit diagrams of devices which have been successful in accomplishing the aforementioned purposes.

In Figure 2, the resistor 26 serves the function of resistor 18 in Figure 1 and resistor 22 the function of resistor 15. The load 21, in Figure 2, equivalent to elements 12, 13, and 14, was a model C Hobart mixer, equipped with a "B" beater. The mixer was operated at 145 r.p.m., reduction of motor speed being through a gear train (not shown). Variable A.C. voltage input was furnished by a Variac type 200–C variable transformer 20. The recording micoammete 25 was an L and N "Micromax" with 4 available ranges: 100, 200, 500, and 1,000 microamperes at full scale deflection. The internal resistance was about 70 ohms. Although the apparatus has been used to investigate a wide variety of materials, such as doughs, pastes, and batters, the description will be confined to flour-water batters which will be hereinafter defined.

The rectifier 23, corresponding to 16 in Figure 1, was a germanium diode, type IN34A, as was the other rectifier shown (30). The non-recording meter 24, which may be used alternatively with meter 25 by means of switch 40 was a 47-ohm meter to which resistance 39 was added for convenience in reading.

The circuit operates as follows: After the motor 21 has run for about 30 minutes, the current drawn by it becomes constant at a value depending on the voltage supplied by the transformer 20, the characteristics of the motor, resistance 22, and the frictional losses in the motor, transmission, and agitator. This current will be termed the "no-load" current.

The transformer 27 is used as a device to keep the voltage between the two legs of switch 41 approximately in phase. So that a closer approach to a voltage of zero can be attained, the resistors 28 and 29 are adjusted to obtain a low voltage at no load. These elements, together with the diode 30 supply the D.C. power corresponding to 19 in Figure 1. The diodes 23 and 30, the resistors 26, 31, and 34, and capacitors 32 and 33 provide a means of changing the A.C. voltage at switch 41 into relatively smooth D.C. voltage. The potentiometer resistor 31 may be used to adjust the voltage applied to the microammeter 24 or instrument 25 precisely to zero at no-load current in the motor. The resistors 36, 37 and 38, together with switch 35, are added so that a large range of motor loads may be measured with good sensitivity by either of the D.C. ammeters. Switch 40 and the separate non-recording microammeter 24 are provided as safety protection for the recorder 25, all initial adjustments for no-load current being made with the switch 40 in the position shown in Fig. 2. A brief description of the operating procedure follows:

(1) With the Meter On-Off Switch 41, in the Off position, turn on the Motor, and allow the motor to warm up for about 5 minutes.

(2) With the Meter-Instrument Switch 40, in the Meter position, the Meter On-Off Switch 41 may be turned On if the Range Selector Switch 35 is known to be in approximately the right position. If not, the latter should be set at its lowest range and a test conducted to determine the proper sensitivity.

(3) The microammeter is adjusted to zero by means of the Rough 28 and 29, and Fine 31, rheostats.

(4) The Meter-Instrument Switch 40 is placed in the Instrument position, and the instrument adjusted to zero with the Fine 31 rheostat. Any change in motor load will now be recorded.

*Calibration of the apparatus.*—A change in the value of the D.C. current which is recorded is an indication of a change in motor load. By proper adjustment of component values an almost linear relation could be arranged, but it is probably simpler to calibrate the recorded values against known torques applied to the mixer output shaft if absolutely quantitative knowledge is needed of the batter consistency over a variety of conditions. A separate calibration would then be required for any change in motors, mixer attachments, batch size, etc., where it would be necessary to change the motor voltage or the sensitivity range. Once the testing program has been established, the recorded values will show differences in mixing characteristics sufficient for control purposes.

The calibration curve may be obtained by loading the power take-off shaft with a small prony brake and measuring the force at the end of the lever arm with a spring scale. The recorded values of current appear on the chart as plateaus over the scale range and are then plotted against the product of force and distance. The torque in gram-centimeters thus obtained is directly proportional to motor output power at constant motor speeds.

Following is a typical application of the apparatus for measuring the mixing characteristics of a flour-water batter: 1500 g. (moisture-free basis) of flour were added to 1875 cc. of water in the 10-quart bowl of the mixer. The temperature of the water was 50–55° C. As the mixing progressed, the change in motor load was recorded.

A mixing curve was obtained which showed that there was a sharp rise in the power requirement immediately after the flour was added to the water. As mixing progressed, the batter became smooth and the flour became completely wetted at a point where the curves reached a minimum. Further mixing resulted in development of the batter and a toughening of the glutten, which is shown by a steadily increasing power requirement.

It has been possible to utilize the recording apparatus in the investigations on the continuous separation of starch and glutten from wheat flour by the "batter process." This device will serve as a control instrument for establishing proper conditions for carrying out the process when various lots of flour are used.

Figure 3 is a diagram of a different species of the device used for measuring the mixing characteristics of doughs and similar mixtures. In Figure 3 the motor 42 of a Brabender sigma-blade mixer having a 50-gram bowl capacity is wired in series with a precision resistor 43 having a low coefficient of thermal resistance change, and is operated at reduced voltage so that the power factor approaches 1.0, and the power used by the motor becomes more closely proportional to the current. By this method the change of motor current with load increment is a maximum. The A.C. voltage drop across the precision resistor 43, which is proportional to the current through the mixer motor 42, is measured by converting it to a D.C. voltage, which is then measured by an electronic voltmeter to drive a 0 to 1 milliampere recording milliammeter. In Figure 3 the voltage applied to the motor 42 is reduced by a variable transformer 44 in order to increase the sensitivity of the apparatus, and the motor current passes through precision resistor 43. The A.C. voltage developed across resistor 43 is essentially proportional to the current through it and the mixer motor. This A.C. voltage is converted to a D.C. voltage by passage through rectifier 45, and the D.C. voltage is applied to the grid of the 6SN7 tube 46, and controls its plate and cathode currents. Part of the cathode current passes through recording milliammeter 47, having a range of 0 to 1 milliampere. An opposing voltage is applied to the meter by means of variable resistor 48 so that the no-load current of the motor can be canceled, and any increment of load thereafter resulting from useful work done by the motor is recorded on the recording milliammeter 47. Sensitivity of the apparatus is controlled by variable resistor 49, the range setting of the recording milliammeter 47, and the setting of the variable transformer 44.

In operation of the apparatus of Figure 3, the dry mixture to be tested is placed in the mixer, the instrument is zeroed by resistor 48 to cancel the no-load current with the motor running but no useful work being done, the desired amount of water is added, and the power requirement of the mixer is recorded for the desired time.

We claim:

1. In an alternating current motor-driven system a differential alternating current measuring system for measuring the load current of the alternating current motor which comprises a variable transformer having an input side rated at a voltage near the rated voltage of the alternating current motor and a variable output side capable of delivering a voltage lower than the rated voltage of said motor, means for connecting the output side of the transformer to the motor, a first precision resistor connected in series with the motor, current measuring means, a second precision resistor, means for connecting said current measuring means and said second precision resistor to said first precision resistor so that the current measuring means and the second precision resistor are in series with each other and the first precision resistor is in parallel with said series connected current measuring means and second precision resistor, and a source of direct current voltage connected across the second precision resistor, said source of direct current being of such magnitude and being so connected as to provide a bias voltage to the current measuring means whereby no current will flow through the current measuring means when the motor is operating under no-load conditions but will permit current to flow through said current measuring means when the no-load current is exceeded.

2. In an alternating current motor-driven system a differential alternating current measuring system for measuring the load current of the alternating current motor which comprises a variable transformer having an input side rated at a voltage near the rated voltage of the motor and a variable output side capable of delivering a voltage lower than the rated voltage of the motor, means for connecting the output side of the transformer to the motor, a precision resistor connected in series with the motor, first rectifying means for rectifying the alternating current drop across said precision resistor, connecting means for connecting said first rectifying means to said precision resistor and to a point of common potential, a first variable resistor, means for connecting said first variable resistor to the output side of the transformer and to the point of common potential, second rectifying means, a second variable resistor, means for connecting said second variable resistor to the point of common potential, means for connecting said second rectifying means to said first and second variable resistors, an ammeter, means for connecting said ammeter to the first rectifying means, and means for connecting said ammeter also to said second variable resistor, said first and second variable resistors together with said second rectifying means providing a source of variable direct current bias voltage to said ammeter to cause no current to flow through said ammeter when the motor is operating under any predetermined no-load condition but will permit current to flow through the ammeter when the no-load current is exceeded.

3. In an alternating current motor-driven system a differential alternating current measuring system for measuring the load current of the alternating current motor which comprises a variable transformer having an input side rated at a voltage near the rated voltage of said motor and a variable output side capable of delivering a voltage lower than the rated voltage of said motor, means for connecting the output side of said transformer to said motor, a first precision resistor connected in series with the motor, rectifying means for rectifying the alternating current voltage drop across said first precision resistor, means for connecting said rectifying means in parallel with said first precision load resistor, a vacuum tube voltmeter comprising a vacuum tube having a cathode, a grid, and a plate and a power supply for said vacuum tube, means for connecting the rectifying means to the grid of said vacuum tube, a second and third resistor in series with each other connected across the plate and cathode, an ammeter, means for connecting the ammeter to the cathode and to the point of connection of said second and third resistor whereby part of the cathode current will flow through the ammeter, a first variable resistor connected in series with the cathode whereby the current flowing in the cathode circuit may be adjusted to zero at any predetermined no-load operation of the motor, and a second variable resistor connected in parallel with the ammeter whereby the sensitivity of said ammeter may be varied with varying load conditions on the motor.

References Cited in the file of this patent

UNITED STATES PATENTS

| | | |
|---|---|---|
| 1,334,395 | Patterson | Mar. 23, 1920 |
| 1,942,920 | Fawkes | Jan. 9, 1934 |
| 2,481,500 | Crowl | Sept. 13, 1949 |
| 2,510,930 | MacLeish | June 6, 1950 |
| 2,654,860 | Lewis | Oct. 6, 1953 |
| 2,762,975 | Breger | Sept. 11, 1956 |
| 2,829,343 | Miller | Apr. 1, 1958 |